UNITED STATES PATENT OFFICE.

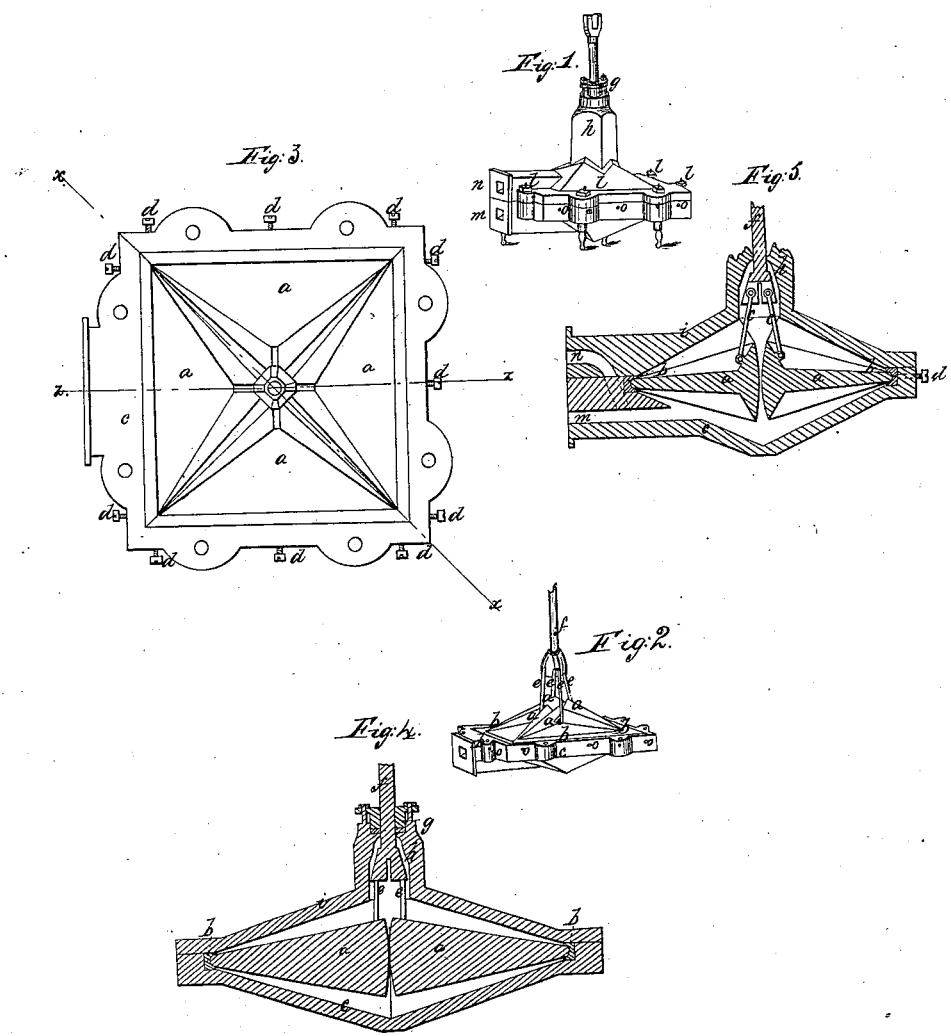

DAVID HINMAN, OF BRUNSWICK, OHIO.

PISTON FOR PUMPS, ENGINES, &c.

Specification of Letters Patent No. 4,396, dated March 7, 1846.

*To all whom it may concern:*

Be it known that I, DAVID HINMAN, of Brunswick, in the county of Medina and State of Ohio, have invented a new and useful piston, which I denominate the "rolling segmental frictionless piston" for pumps, steam-engines, and all other purposes in which pistons are used, and that the following is a full, clear, and exact description of the principle or character, which distinguishes my invention from all other things before known, and of the manner of making, constructing, and using the same, reference being had to the accompanying drawings, making part of this specification, in which—

Figure 1 is a perspective view of a pump with my improved piston inclosed. Fig. 2, a like view with the upper half of the casing removed to exhibit the segmental rolling piston. Fig. 3, a plan of Fig. 2; Fig. 4, a vertical diagonal section taken at the line (X X) of Fig. 3, and Fig. 5, a longitudinal vertical section taken at the line (Z Z) of Fig. 3. Figs. 3, 4, and 5 being on a larger scale than Figs. 1 and 2.

The same letters indicate like parts in all the figures.

Pistons for pumps, engines, &c., which have heretofore been made to slide in a cylindrical or other formed casing, or worked with a hinged or loose flap like a bellows, require much power to overcome the friction of the packing, whether made of metal, hemp, or other elastic substance, or to overcome the rigidity of the substances employed to connect the flap. When metallic packing is employed, the rubbing parts have to be made with great care and accuracy, and still give much friction and consequently wear very rapidly, and require frequent adjustment, and cannot be advantageously employed with fluids containing earthy matter. With other kinds of packing the wear is not only very rapid, but to prevent leakage must be made very tight at the expense of power, and yet, when exposed for any length of time without moisture, it is liable to leak. And finally the bellows flap piston, which avoids the friction of the packed piston is found in practice to be more objectionable than the others, on account of the rigidity of the substances employed to form the connection, and its liability to crack and break, particularly when exposed for any length of time without moisture.

In consequence of the magnitude of these evils, many unsuccessful attempts have been made to remove them. My improvement, it is confidently believed, will effectually remove them; it consists in substituting for the metallic or other packing and the hinged flap the rolling of metallic or other hard substances on each other, by making the piston of three, four, or more triangular parts, turning on rounded edges along the outer face of the triangles, the other faces being made in the form of segments of cones and rolling on each other when moved together in the same direction, all the segments being jointed to one piston or connecting rod. The effect of their vibration will be similar to the working of the flap of a bellows.

In the acompanying drawings, which represent my improvement applied to a pump, (*a, a, a, a*) represent my improved piston made in four segments, which, when put together, form a parallelogram, the outer edges being rounded or beaded to turn in corresponding grooves in four bars (*b, b, b, b*), the ends of which are mitered and properly fitted to the lower part of the casing (*c*) with either ground or packed joints, and for the purpose of adjusting the rolling faces of the segments to each other, I employ set screws (*d*), tapped in the sides of the casing and bearing against the bars (*b*), so that by the turning of these screws the bars can be adjusted to the outer rounded edges of the segments, and the rolling surfaces of these (the segments) to each other. The rolling faces of the parts of the piston are segments of cones, each being a segment of two cones connected by their bases, the axis of the cones being the axis of vibration of each segment, so that when all of them are vibrated together, the faces that are in contact roll on each other without friction, and turn on their bearings in the bars (*b*). To save metal and weight, the rolling faces are flanches, the extent of which will depend upon the amount of vibration which they are to have in operation. These segments are connected together and with the piston rod (*f*) by means of four joint links (*e, e, e, e*). The piston rod passes through a stuffing box (*g*) in the upper part (*h*) of the top of the casing which surrounds the connecting links (*e*). The casing (properly adapted in form to the piston and its vibration) is made in two parts, the bottom (c) and the top (i) connected together by screw bolts (l), and the induction passage (m) is made in the lower part, and the eduction (n) in the upper part.

The pipes and valves may be adapted to this pump in any desired manner as that makes no part of my invention.

It will be obvious from the foregoing that a piston on this principle can be made of any desired number of parts, not less than three, the external form of which will be an equilateral figure corresponding with the number of segments composing it, that the outer edge on which they turn may be knife edged, rounded, or any other form, as may be desired, and that it is applicable to all purposes for which pistons of other constructions are employed, whether to move fluids or be impelled by them.

What I claim as my invention and desire to secure by Letters Patent, is—

Composing a piston of three or more segments rolling on each other as they vibrate together, each on a separate axis along or near to their outer edge, substantially as herein described.

DAVID HINMAN.

Witnesses:
 DANIEL B. STOW,
 JOHN W. STOW.